United States Patent [19]

Shtayer et al.

[11] Patent Number: 5,485,456
[45] Date of Patent: Jan. 16, 1996

[54] ASYNCHRONOUS TRANSFER MODE (ATM) SYSTEM HAVING AN ATM DEVICE COUPLED TO MULTIPLE PHYSICAL LAYER DEVICES

[75] Inventors: Ronen Shtayer, Tel-Aviv; Roni Eliyahu, Ramat-Gan; Yehuda Shvager, Hashmonaim; Yaron Ben-Arie, Ramat-Gan, all of Israel

[73] Assignee: Motorola, Inc., Schaumburg, Ill.

[21] Appl. No.: 326,972

[22] Filed: Oct. 21, 1994

[51] Int. Cl.$^6$ ............................................. H04J 3/24
[52] U.S. Cl. .................... 370/60; 370/85.9; 370/85.11; 370/85.4; 370/94.1
[58] Field of Search ......................... 370/60, 60.1, 110.1, 370/85.4, 94.1, 94.2, 85.9, 85.11

[56] References Cited

U.S. PATENT DOCUMENTS

| | | | |
|---|---|---|---|
| 4,779,093 | 10/1988 | Watkins | 370/85.1 |
| 5,101,404 | 3/1992 | Kunimoto et al. | 370/60 |
| 5,214,642 | 3/1993 | Kunimoto et al. | 370/60 |
| 5,303,236 | 4/1994 | Kunimoto et al. | 370/60.1 |
| 5,383,183 | 1/1995 | Yoshida | 370/60.1 |

*Primary Examiner*—Hassan Kizou
*Assistant Examiner*—Seema S. Rao
*Attorney, Agent, or Firm*—Keith E. Witek

[57] ABSTRACT

An asynchronous transfer mode (ATM) system has a plurality of physical layers (24, 50, 52, and 26) coupled to one ATM layer (12) for communicating ATM data cells. In order to allow bi-directional communication, both the receive interface and the transmit interface of FIGS. 14 and 15 are coupled between the ATM layer and each physical (PHY) layer in the plurality of physical layers. In order to identify which physical layer of the plurality of physical layers is to either receive or transmit a data cell, a physical layer ID byte is transmitted along with the UTOPIA protocol multi-byte ATM data cell to address one physical layer in the plurality of physical layers.

21 Claims, 8 Drawing Sheets

ASYNCHRONOUS TRANSFER MODE (ATM) SYSTEM HAVING AN ATM DEVICE COUPLED TO MULTIPLE PHYSICAL LAYER DEVICES

FIELD OF THE INVENTION

The present invention relates generally to data processing systems, and more particularly, to asynchronous transfer mode (ATM) communication systems for communicating data cells.

BACKGROUND OF THE INVENTION

In previous ATM systems it was only possible to couple one ATM layer to one physical (PHY) layer. If the PHY layer was running at a high frequency transmission rate, then the fast rate of the ATM layer was used with little waste. Usually, the PHY layer operated at a transmission speed which was much slower than the operational speed of the ATM layer resulting in waste due to unused performance in the ATM layer.

In order to solve this problem, the ability to couple multiple PHY layers to one ATM layer was researched but all implementations to date have resulted in cumbersome protocols, added pins to the ATM or PHY layer packages, and other undesirable results. Therefore, a multi-PHY to ATM layer protocol, system, and method is desired that is easy to use and does not result in added complexity or cost.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Figure 1:
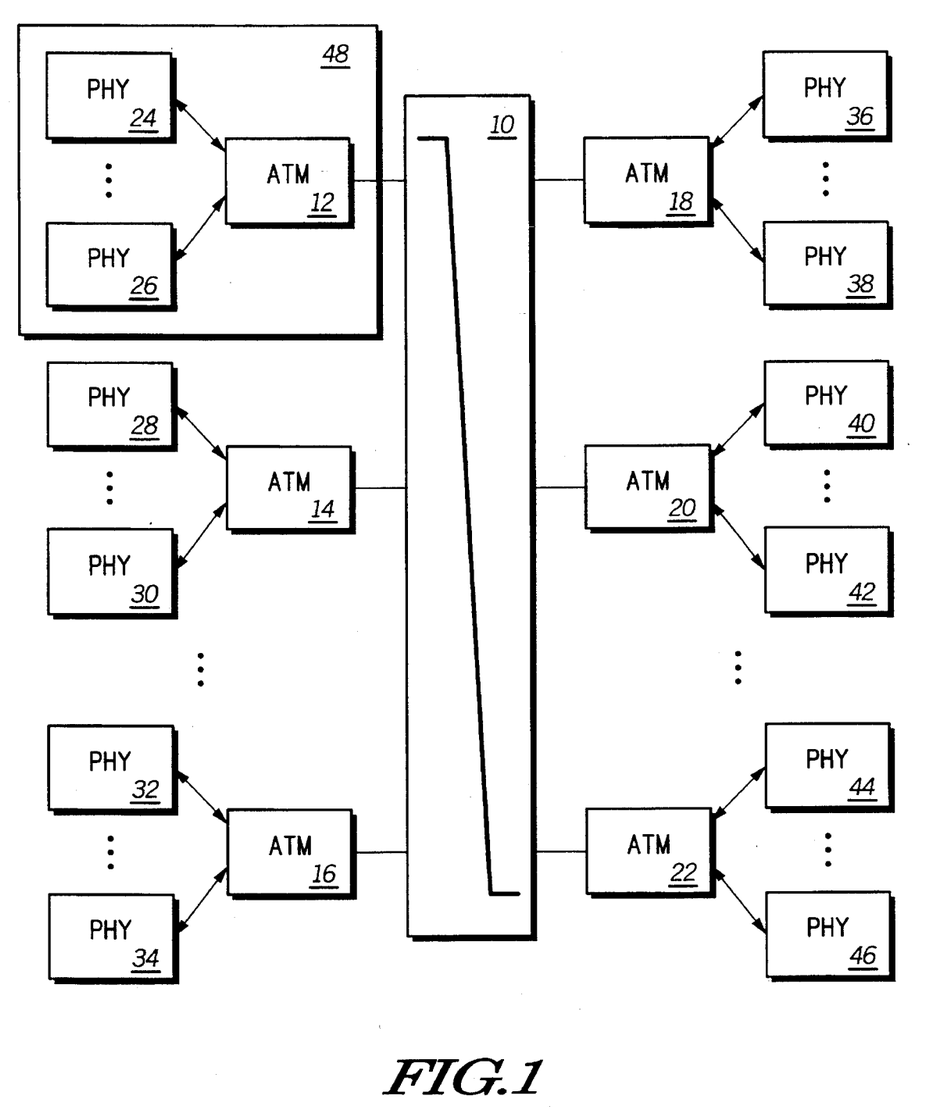
FIG. 1 illustrates, in a block diagram, an asynchronous transfer mode (ATM) data processing system in accordance with the present invention.

This invention relates to a data interface between an asynchronous transfer mode (ATM) Layer device and multiple Physical Layer devices (PHY layer devices). An ATM Layer device (either a cell processor or a Segmentation and Reassembly (SAR) device) is typically designed to work together with one PHY Layer device of the same throughput. Since some PHY Layer devices operate at high bandwidths, the ATM Layer device is designed to operate at a high bandwidth in order to keep pace. However, some inexpensive PHY Layer devices operate at only a fraction of the ATM Layer bandwidth thereby wasting a large portion of the ATM Layer bandwidth needlessly. In these mis-matched bandwidth systems, the system cost is reduced if several low-bandwidth PHY Layer devices are connected to a single ATM Layer device as shown in FIG. 1. FIG. 1 illustrates that a data cell communication system can have multiple PHYs 24–26 coupled to one ATM layer 12 wherein the one ATM layer 12 communicates to a switch circuit 10. Many other ATM and PHY layers are illustrated in FIG. 1 and all are configured/coupled in a manner similar to the ATM layer 12 and the PHY layers 24–26.

In order to couple several PHY layers to one ATM layer, some problems are encountered. For example, the ATM Layer device should have a minimum of I/O pins. Optimally, the number of I/O pins should be identical whether supporting a single PHY device or multiple PHY devices. Received ATM data cells are routed by a virtual connection identifier (VCI) contained in the header portion of each cell. The identifier of each connection on an individual physical link is unique. However, if cells from multiple physical links are routed through a common cell processor, the same identifier may be used by cells from different links thereby causing confusion. These cells must be distinguished in order to route them correctly, so the ATM Layer device must have a method for knowing from which physical link each cell arrived. In addition, ATM data cells that are transferred from the ATM layer to the physical (PHY) layer are intended for only one of the PHY Layer devices. There must be a method for the ATM cell processor to indicate which PHY Layer device should copy the cell and which PHY layers should ignore that particular ATM data cell. Also, the addressed PHY Layer device must communicate its i inability to receive more cells if its FIFO is full without preventing other PHY layers from continuing to receive cells.

Figure 2:
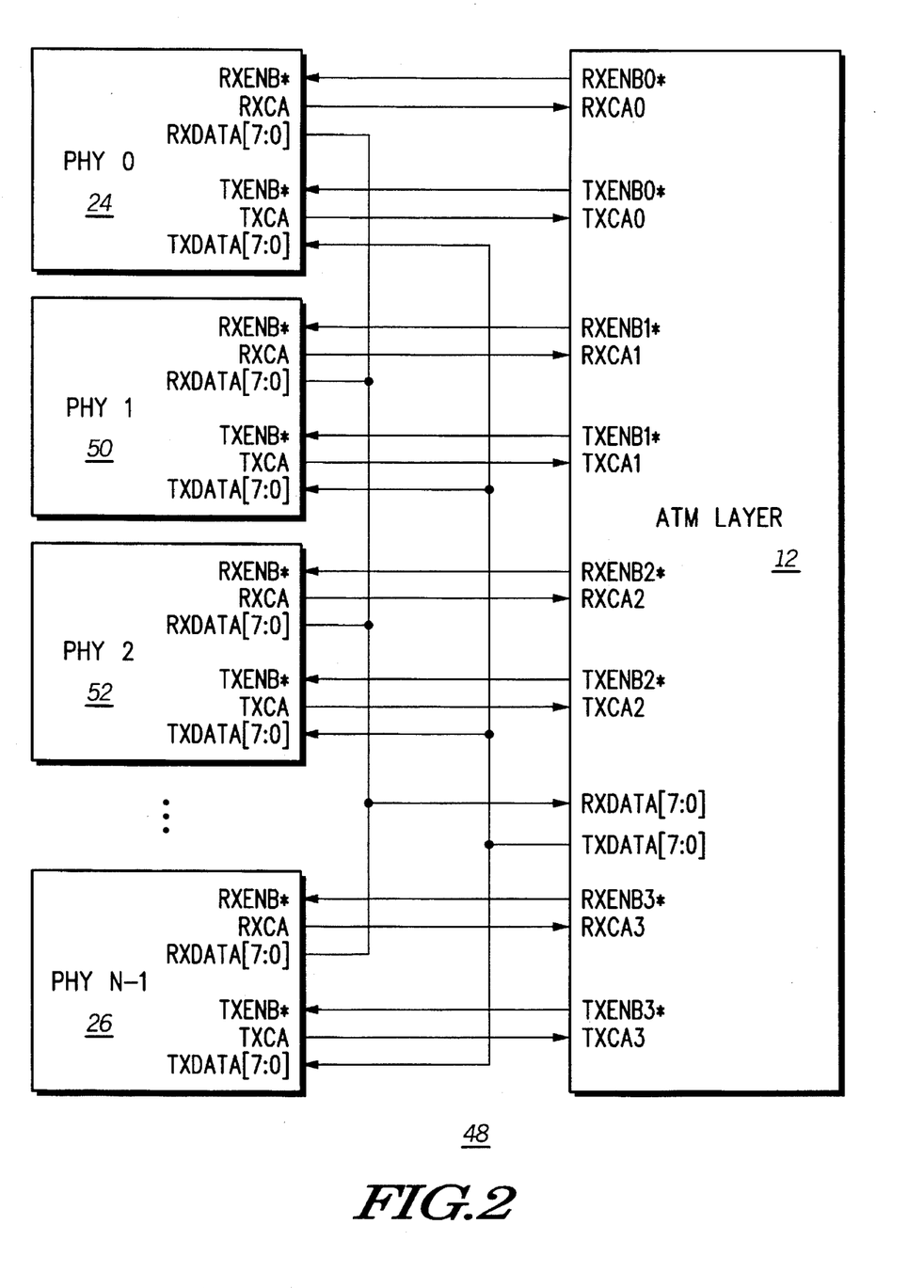
FIG. 2 illustrates, in a block diagram, a detailed illustration of a portion of the FIG. 1, the detailed illustration depicting an interconnection scheme of a configuration which is in accordance with the present invention.

In order to extend one ATM device to support multiple PHY devices, some changes and extensions to ATM were made. The extension involves tri-stating the receive data bus to reduce the number of data pins. Each PHY device drives the receive data bus or samples the transmit data bus only when it is enabled by the ATM device. This solution requires four control signals for each PHY device that is supported, two control signals for the receive interface and two control signals for the transmit interface (see FIG. 2). In this way the physical link number involved in the data transfer is known explicitly since only one PHY device in each direction will be enabled by the ATM device at a given time. The cost of this solution is the addition of four pins on the ATM device for each PHY device to be supported. When many PHY devices are to be supported, the extra pins may significantly increase the cost of the ATM device. This was not advantageous and is further improved below.

In order to keep the cost from rising due to the above mentioned extra pins, another level of multiplexing was used. In other words, in order to keep the number of pins on the ATM Layer device independent of the number of PHY Layer devices being supported (within reason), the control pins, as well as the data pins, are shared or multiplexed by all of the PHY devices. Pins that are inputs to the PHY devices are simply connected to all of the PHY devices in parallel. Pins that are outputs from the PHY devices are defined as tri-stateable. Each PHY device may drive these pins only when it is involved in the current cell transfer. Since the ATM device cannot determine implicitly which PHY device is driving the interface, a unique PHY Identification number (PID) is assigned to each PHY device. The PID is appended to the beginning of each 53-byte ATM cell when it is transferred across the interface. In order to limit the bandwidth overhead required for transferring the PID, the interface is limited to be cell-based (i.e. the choice of which PHY device is active is made once per cell and cannot be changed until the entire cell has been transferred).

Figure 3:
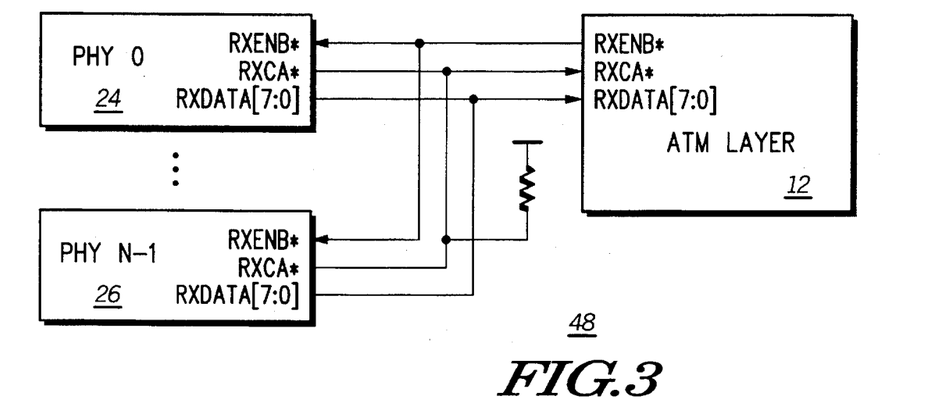
FIG. 3 illustrates, in a block diagram, a detailed illustration of a portion of the FIG. 1, the detailed illustration depicting an receive protocol interconnection scheme of a preferred configuration which is in accordance with the present invention.

The multiple PHY receive interface appears as shown in FIG. 3. The interface signals are connected to all of the PHY devices in parallel. The input signals to the ATM Layer (RxCA* and RxData) are tri-stateable. An external pull-up resistor is provided to keep RxCA* negated when it is not being driven. The PHY devices have a built-in priority mechanism which allows (at most) one of the PHY devices to drive the shared signals at a time, thereby preventing contention on transfers to the ATM Layer device. The priority mechanism operates on a cell basis so that the ATM Layer device receives complete cells. The signals used in the receive interface are:

1. RxData [7:0]—Receive Data—These signals carry the receive data from the PHY to the ATM device. These signals are tri-stateable and are driven by the active PHY for each cell transfer.

2. RxCA*—Receive Cell Available—This signal indicates that a PHY device has a cell available for transfer to the ATM Layer. It is driven by the active PHY and is held negated by an external pull-up resistor if none of the PHY devices are active.

3. RxEnb*—Receive Enable—This signal is driven by the ATM Layer device. It is asserted to indicate that the ATM Layer device is able to receive a cell from the PHY Layer.

Figure 4:
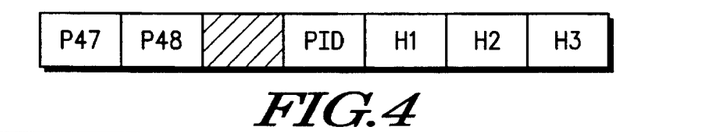
FIG. 4 illustrates, in a block diagram, a serial stream of data values processed by the receive protocol interconnection scheme of FIG. 3 in accordance with the present invention.

When a received ATM cell is transferred from a PHY Layer device to the ATM Layer device, an extra byte transfer is added before the first byte of the 53-byte ATM data cell which is known as the PID. The PHY Identification Number (PID), which is known by the PHY Layer device, is encoded in this preceding extra byte. This PID is treated by the ATM Layer device as part of the routing information. It distinguishes cells which have identical virtual connection identifiers, but arrived from different physical links, in order that the correct switching information can be retrieved for each ATM cell. The data sequence for transferring received cells is shown in FIG. 4. The data bus is not driven during one clock cycle between cells to prevent contention between the PHY devices (i.e., time is given to properly multiplex, switch tri-state buffers, give time for voltages to settle, and the like).

Figure 5:
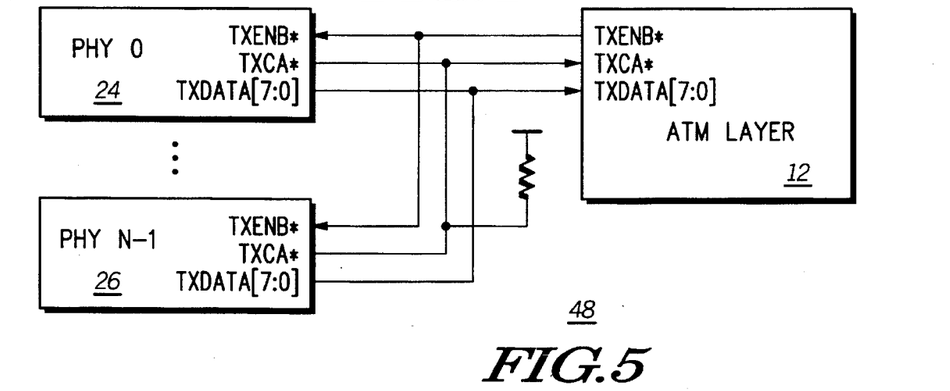
FIG. 5 illustrates, in a block diagram, a detailed illustration of a portion of the FIG. 1, the detailed illustration depicting an transmit protocol interconnection scheme of a preferred configuration which is in accordance with the present invention.

The multiple PHY transmit interface appears as shown in FIG. 5. The interface signals are connected to all of the PHY devices in parallel as illustrated. The input signal to the ATM Layer (TxCA*) is tri-stateable. An external pull-up resistor is provided to keep TxCA* negated when it is not being driven. The signals used in the transmit interface are:

1. TxData [7:0]—Transmit Data—These signals carry the transmit data from the ATM device to the PHY device.

2. TxCA*—Transmit Cell Available—This signal indicates that the addressed PHY device is able to receive a cell from the ATM Layer. It is driven by the active PHY and is held negated by an external pull-up resistor if none of the PHY devices are active.

3. TxEnb*—Transmit Enable—This signal is driven by the ATM Layer device. It is asserted to indicate that the ATM Layer device is transferring a cell to the PHY Layer.

Figure 6:
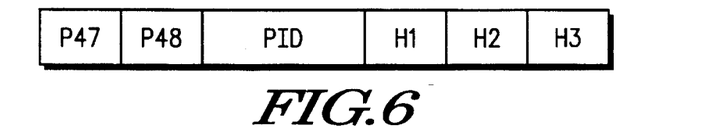
FIG. 6 illustrates, in a block diagram, a serial stream of data values processed by the transmit protocol interconnection scheme of FIG. 5 in accordance with the present invention.

When the ATM cell processor has an ATM cell to be transmitted to one of the PHY Layer devices, a byte containing the PID is transmitted first. The PHY that is being addressed is activated and responds by driving the TxCA* signal. Once the TxCA* signal is asserted, the ATM Layer device transfers the ATM cell, and the activated PHY copies the data. The data sequence for transferring transmitted cells is shown in FIG. 6.

FIGS. 7 through 15 further illustrate multiple physical layers coupled to one ATM device for use in an ATM system using the UTOPIA protocol. The process of connecting multiple physical layers to one ATM device taught herein has many advantages. One advantage is that the system and method taught herein requires only minimal changes or additions to the existing UTOPIA interface used for ATM systems. In addition, the protocol disclosed herein works on a cell orientation bases. The protocol taught herein adds only one byte, a physical ID, to an ATM cell in order to enable operation. The TxCA* and RxCA* signals become active low, thus enabling wire ANDing which improves operation.

Figure 7:
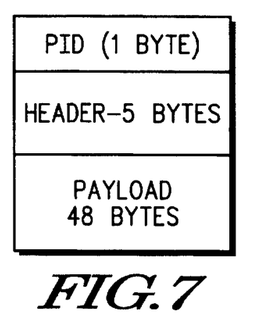
FIGS. 7–9 each illustrate, in a block diagram, one configuration of an asynchronous transfer mode (ATM) data cell in accordance with the present invention.

FIG. 7 illustrates, in a block diagram, one form of an ATM cell which may be transmitted between a physical layer and an ATM device. FIG. 7 illustrates an ATM data cell comprising a header portion which contains five data bytes and a payload data portion which comprises 48 data bytes. Before the header section, a PID (Physical ID) byte is sent along with the header and payload portions of the ATM data cell. This PID byte is used to indicate which physical layer amongst several physical layers is being addressed. FIG. 7 illustrates an ATM cell which does not change any byte in the current UTOPIA cell entity. This meaning that the header and payload together to form an ATM cell is unchanged, compared to old UTOPIA standards and the only change is that the PID byte is added to the front of the cell.

PID information may be communicated within an ATM system via the data lines or other conductors between devices. In addition, a PID value may be communicated in a serial or parallel manner by nearly any communication protocol/form.

Figure 8:
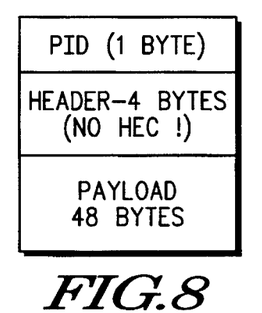

FIG. 8 illustrates an ATM data cell which has a form different from that illustrated in FIG. 7. FIG. 8 illustrates a header portion which comprises only four bytes and contains no header error check (HEC) byte and a payload section which comprises 48 bytes. The ATM data cell illustrated in FIG. 8 is the easiest implementation to use in most applications.

Figure 9:
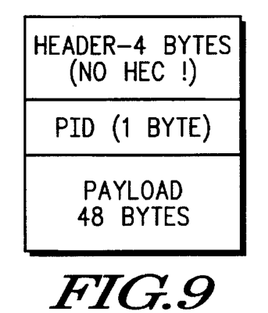

FIG. 9 illustrates an ATM data cell which begins by transmitting four header bytes with no HEC, followed by the PID byte, followed by the payload which comprises 48 bytes of information. When using this ATM data cell, four bytes of buffering is needed before the PID cell is sent in order to capture the header information for each physical layer.

FIG. 7 through FIG. 9 illustrate three possible ATM cell configurations. In addition to these three configurations, other configurations may be used as long as the configuration includes a PID byte somewhere within the ATM cell or serial transmission process. In addition, other known methods for communicating PID data may be used in the ATM system, so long as the PID is used in some manner to identify one unique physical layer as a device which is to receive and/or transmit an ATM data cell.

Figure 10:
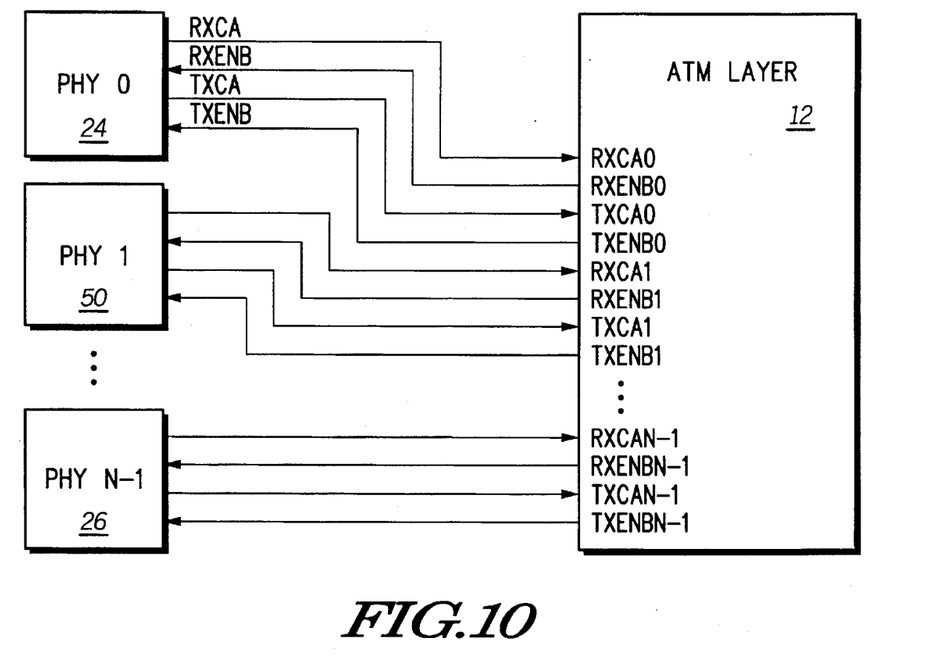
FIGS. 10–11 each illustrate, in a block diagram, a portion of FIG. 1 in further detail and in accordance with the present invention.

FIG. 10 illustrates an ATM portion 48 which was illustrated previously in FIG. 1. FIG. 10 illustrates that a physical layer 24, a physical layer 50, and a physical layer 26 is connected to an ATM layer 12. Each physical latter 24, 50, and 26 is coupled to the ATM layer 12 via a plurality of signals. For each plurality of signals coupled to one of the physical devices 24, 50, and 26, the ATM layer 12 has corresponding connections/pins. Each physical layer 24, 50, and 26 has a signal RxCA, RxENB, TxCA, and TxENB which connects the particular physical layer to the ATM layer 12. The ATM layer 12 has four pins for each physical layer to which it is coupled. Therefore, if N physical layers (wherein N is a finite positive integer) are coupled to ATM layer 12, ATM layer 12 must have 4*N pins added to an IC package to handle all the RxCA, RxENB, TxCA, and TxENB signals in the ATM section 48. Therefore, the configuration illustrated in FIG. 10 is not always optimal and when connecting to multiple physical devices can result in many more packaging pins/terminals and a higher system cost.

Figure 11:
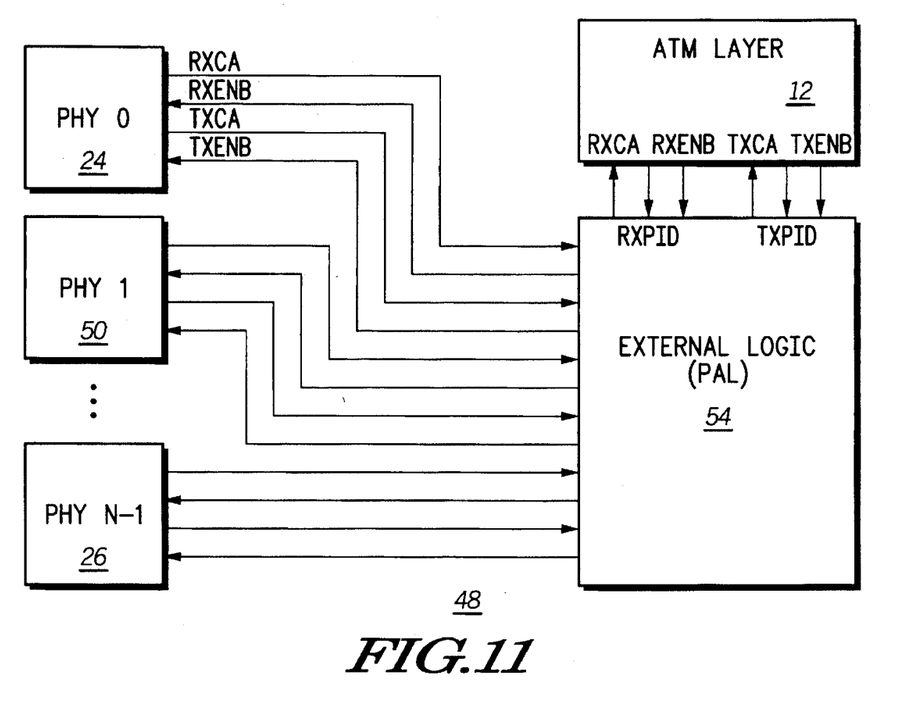

FIG. 11 illustrates the ATM portion 48 of FIG. 1 configured in one possible system. FIG. 11 illustrates that the physical layers 24, 50, 26, and any other physical layers are coupled to the ATM layer 12 via external logic 54, which is typically a programmable logic array (PLA), PAL, ASIC, or a like device. The signals, which are inputs and outputs from the physical layer devices 24, 50, and 26 in FIG. 11, are identical to the signals illustrated in FIG. 10 and are not further discussed here. The external logic 54 is used as a glue layer between the ATM layer 12 and the physical devices 24, 50, and 26. Therefore, the external logic 54 may be used to compress the many inputs and outputs coming from the five layers 24, 50, and 26 to four inputs and outputs which can be communicated to layer 12 as illustrated in FIG. 11. This method, although useful in some systems, is not an optimal design for an ATM system in some cases.

Figure 12:
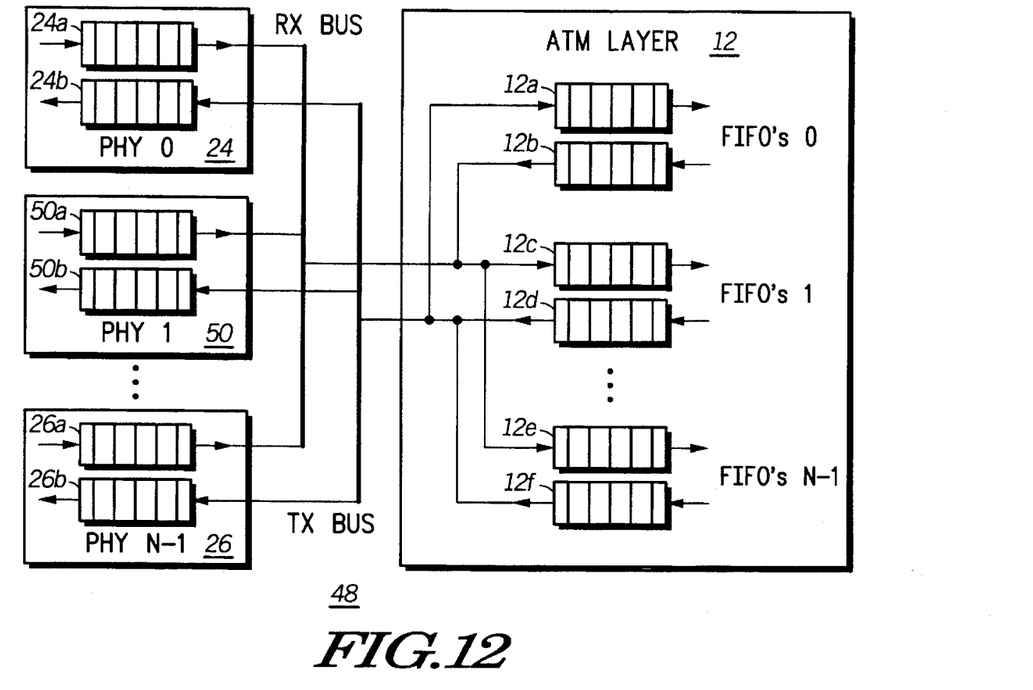
FIG. 12 illustrates, in a block diagram, an ATM system having multiple FIFOs within the ATM layer in accordance with the present invention.

FIG. 12 illustrates the ATM portion 48 of FIG. 1 in further detail. FIG. 12 illustrates one optimal connection of multiple o physical layers to single ATM layer 12. FIG. 12 illustrates a receive bus denoted as Rx bus and a transmit bus denoted as Tx bus. A receive queue 24a, which queues or stores incoming ATM data cells for transmission to the ATM layer, is coupled to the Rx bus from within physical layer 24. A receive queue 50a, which receives ATM data cells for transmission to the ATM layer 12, is also coupled to the Rx bus. A receive queue 26a, which is within PHY layer 26, is also coupled to the Rx bus in a manner similar to queues 24a and 50a. The Tx bus is coupled to a transmit queue 24b within physical layer 24. Transmit queue 24b is used to queue/store ATM data cells being transmitted from the ATM layer to the physical layer 24 and out to an external device (not illustrated). In addition, physical layer 50 contains a transmit queue 50b for receiving ATM data cells from the transmit bus and storing them for external communication. Physical layer 26 contains a transmit queue 26b, which is coupled to the A TM layer via the TX bus and is used in a manner similar to queues 24b and 50b. ATM layer 12 contains a plurality of transmit and receive queues. FIG. 12 illustrates that the queues within the ATM layer 12 are grouped in pairs, wherein each pair of queues of an input queue and an output queue. FIG. 12 illustrates that an input queue 12a is paired with an output queue 12b to form one FIFO within the ATM layer 12. FIG. 12 illustrates that an input queue 12c is paired with an output 12d, which is used to form another FIFO in the ATM layer 12. In addition, FIG. 12 illustrates an input queue, 12e and an output 12f, which are paired to form yet another FIFO within the ATM layer 12. In general, in FIG. 12, if N physical layers are coupled to the ATM layer 12, then N pairs of input and output buffers are formed within the ATM layer 12 (N being a finite positive integer). In another form, the ATM layer 12 may contain less than N–pairs of cues wherein a pair of cues is multiplexed to more than one physical layer.

Figure 13:
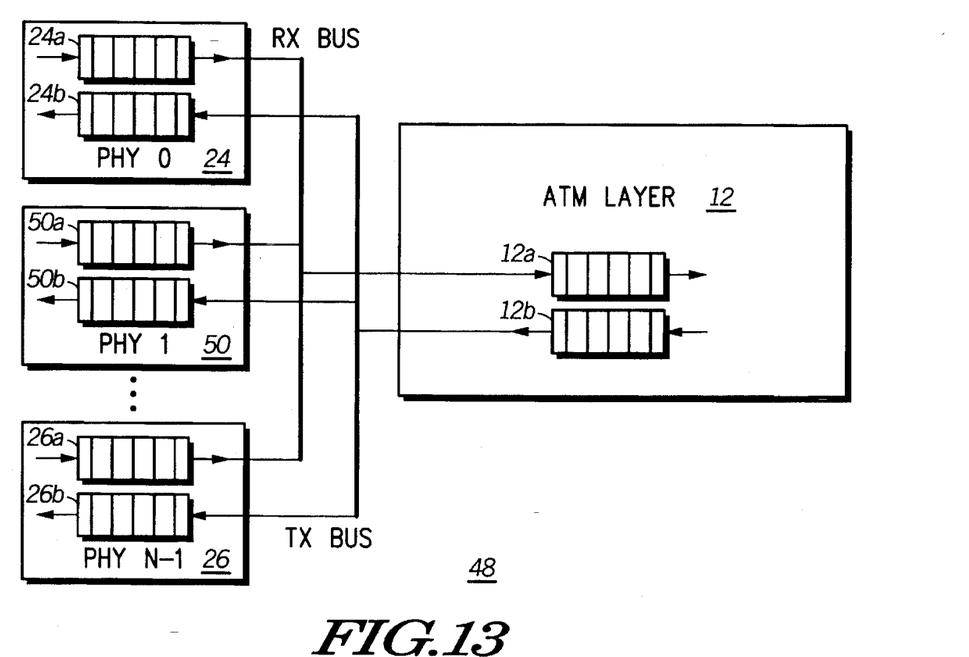
FIG. 13 illustrates, in a block diagram, an ATM system having one FIFO within the ATM layer in accordance with the present invention.

FIG. 13 illustrates a device which is similar to the ATM device in FIG. 12. FIG. 13 illustrates N physical layers 24, 50, and 26 having both received cues and transmit cues as discussed in FIG. 12 above. In addition, FIG. 13 also illustrates the Rx bus and Tx bus discussed above in FIG. 12. The difference between FIG. 12 and FIG. 13 is that FIG. 13 has an ATM layer 12, which has fewer input and output queues. In particular, FIG. 13. illustrates that the ATM layer 12 has a single input queue 12a coupled to the receive bus and a single output queue 12b coupled to the transmit bus. Therefore, ATM layer 12 uses one global FIFO structure to communicate with all the physical layers coupled to the RX bus and TX bus.

Figure 14:
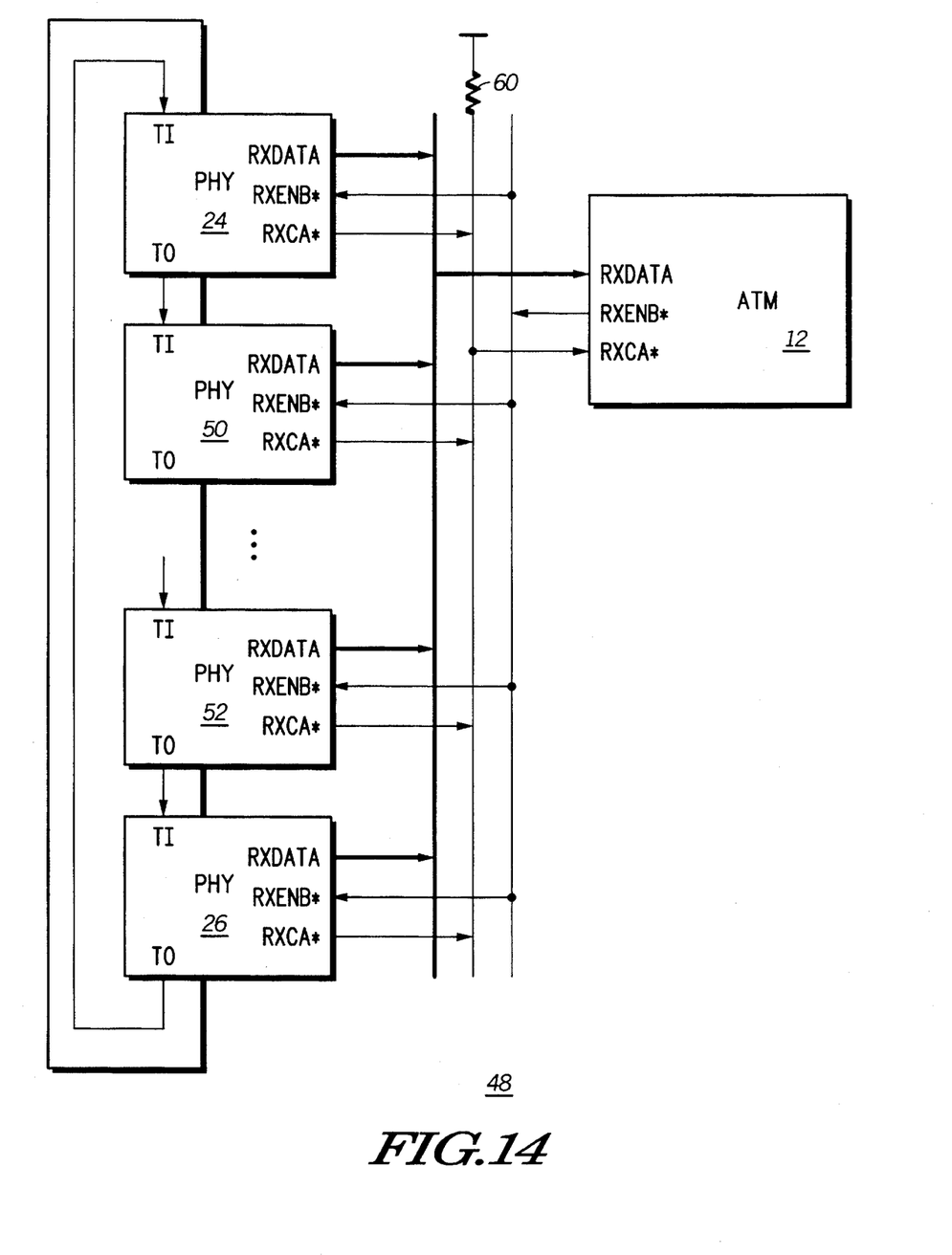
FIGS. 14 and 15 together illustrate, in block diagrams, an ATM system having both a transfer protocol and a receive protocol, both being in accordance with the present invention.

FIG. 14 illustrates the ATM portion 48 of FIG. 1 in more detail. FIG. 14 illustrates the receive interface used between an ATM layer 12 and multiple physical layers. FIG. 14 illustrates that four or more physical layers are coupled to the ATM layer 12. Each physical layer has as an output in the receive interface of the ATM system and Rx data signal. The Rx data signal is either a single conductor or a bus and in a preferred form communicates eight bits of parallel data in order to transmit the 53 byte ATM data cells between devises in the ATM system one byte at a time. FIG. 14 illustrates that the Rx data pins for each of the five devices are coupled to the receive bus and coupled to the receive data input of the ATM layer 12. FIG. 14 illustrates that each physical layer has an output labeled RxCA. All of the RxCA signals output from each physical layer are coupled together through a pull-up resistor 60 to a voltage supply as illustrated. In addition, all the RxCA outputs which are wired together from the physical layer are input to one input of the ATM layer 20 labeled RxCA. Each physical layer in FIG. 14 has an input labeled RxENB. Each input labeled RxENB for each physical layer in FIG. 14 is wired together and connected to an output of the ATM layer 12 which is labeled RxENB.

In FIG. 14, the signal RxCA is used to communicate to the ATM layer 12 that one physical layer has a cell which is to be communicated to the ATM layer 12. Once the ATM layer 12 determines that it can except as input the ATM data cell which is pending, the ATM layer 12 asserts the RxENB output to inform the physical layer that it can receive the ATM data cell. Once the physical layer which asserted the RxCA receives the RxENB signal, that physical layer outputs an ATM data cell via the eight bit bus labeled as Rx data. Therefore, FIG. 14 illustrates the protocol and interface used to transmit data between multiple physical layers and one ATM layer wherein the number of pins on the ATM layer 12 are significantly reduced and cost efficient. In addition, the pull-up resistor in FIG. 14 is used to ensure that when all RxCA signals are tri-stated that this signal is pulled up to a de-asserted value so that no false transmission occur within the system. FIG. 14 illustrates optional inputs and outputs labeled TI and TO on each physical layer within FIG. 14. These inputs and outputs are wired in a serial manner to allow the physical layers to arbitrate between one another for use of the various buses illustrated in FIG. 14.

Figure 15:
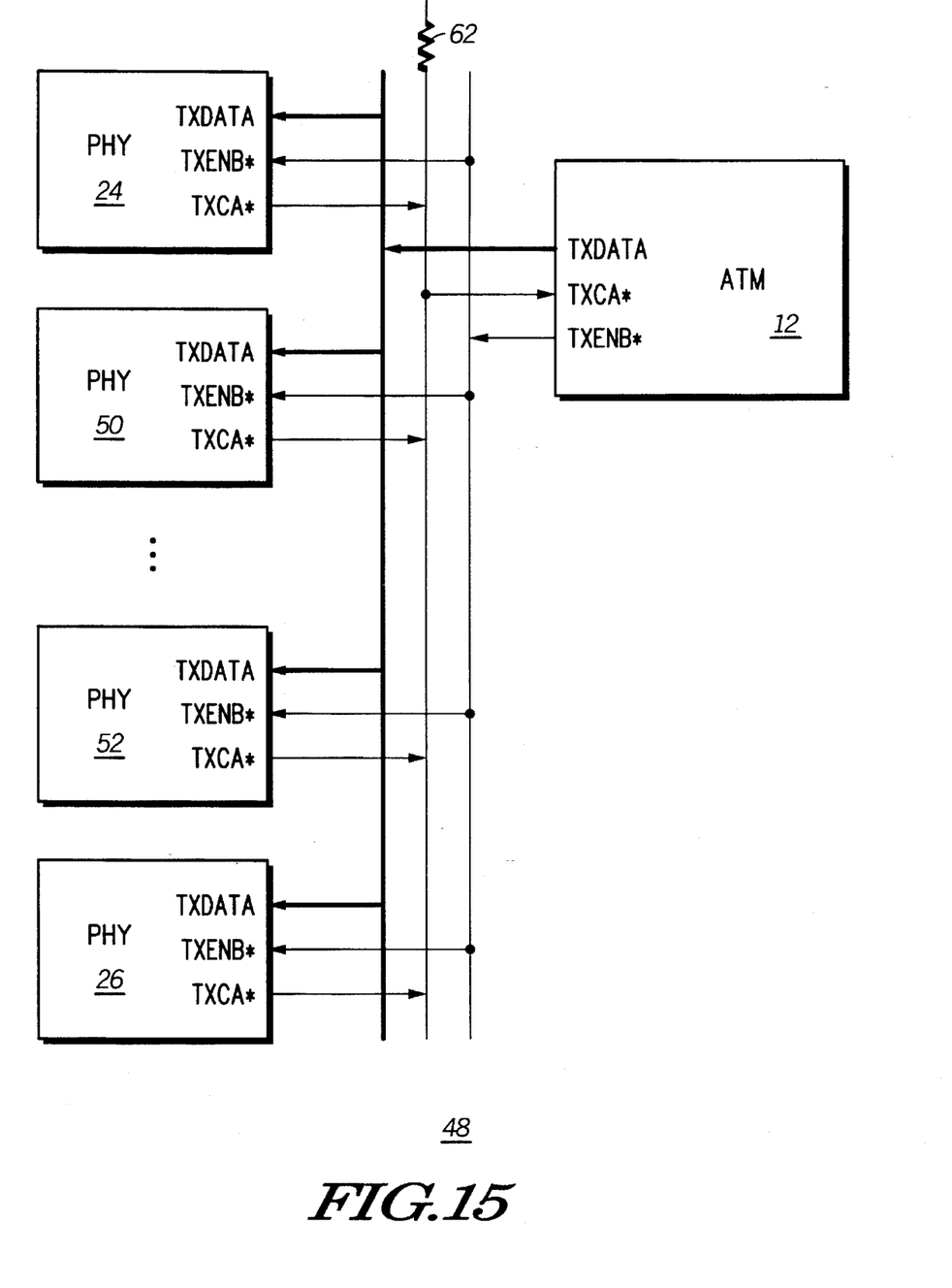

FIG. 15 illustrates the transmit interface which is used in conjunction with FIG. 14 to form a bi-directional interface within an ATM system. FIG. 15 illustrates four or more physical layers 24, 50, 52, and 26 which are coupled through buses to a single ATM layer 12. Each physical layer in FIG. 15 has a Tx data input which is typically an eight bit input bus for communicating ATM data cells. In addition, each physical layer in FIG. 15 comprises an input control signal labeled TxENB and an output control signal labeled TxCA. All the TxENB inputs for each physical layer are wired together and connected to a TxENB output of ATM layer 12 in FIG. 15. In addition, all TxCA outputs of each physical layer in FIG. 15 are connected together and connected to a TxCA input of the ATM layer 12. In addition, all the TxCA outputs of the physical layers which are coupled together are pulled up through a pull-up resistor 62 to a voltage supply in a manner similar to pull-up resistor 60 in FIG. 14 to insure proper de-assertion.

When a particular physical layer has storage space to receive an ATM data cell from the ATM layer 12, the physical device asserts TxCA to signal this state to the ATM layer 12. In response to receiving the asserted TxCA, the ATM layer responds to the particular physical layer via a TxENB assertion. Once the particular physical layer receives the asserted TxENB signal it begins to store an ATM data cell which is transmitted to it via the Tx data lines coupled between the ATM layer 12 and the particular physical device which asserted TxCA. The PID within the ATM data cell is used to identify and determine which physical layer in the plurality of physical layers of FIG. 15 receives the ATM data cell which is transmitted.

Figure 16:
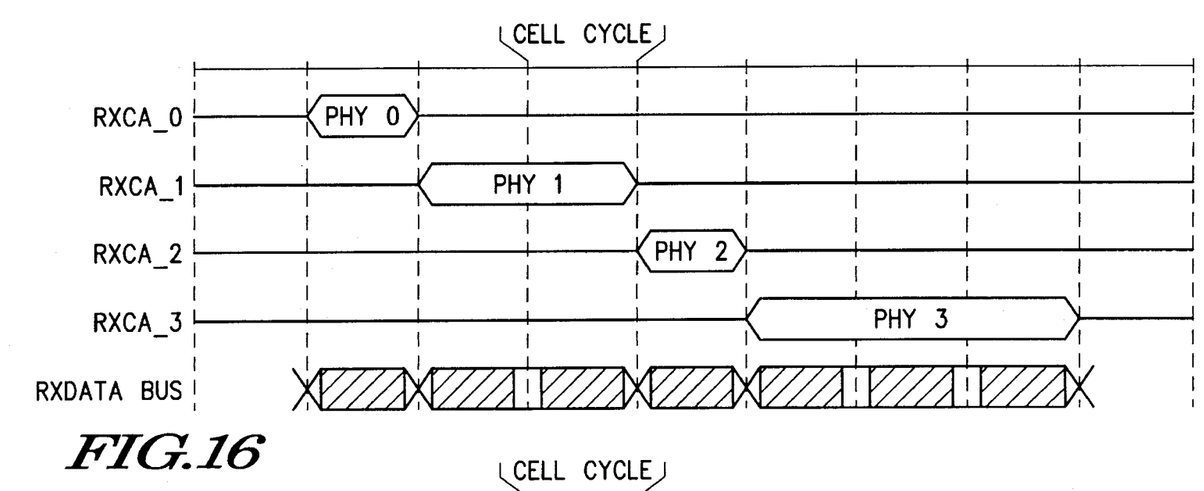
FIGS. 16 and 17 together illustrate, in timing diagrams, the timing and data cell transfers within an ATM system having both a transfer protocol and a receive protocol, the timing and transfers being in accordance with the present invention.

FIG. 16 illustrates a timing diagram of the operation of FIGS. 14 and 15. FIG. 16 illustrates a plurality of receive cycles. In FIG. 16, one cell is first transmitted from PHY0 to the ATM device. Two cells are transmitted from PHY1 to the ATM device. Then, one cell is transmitted from PHY2 to the ATM device. Finally, three ATM data cells are transmitted from PHY3 to the ATM device. FIG. 16 illustrates that multiple ATM data cells can be communicated through different PHY layers so that each of the PHY layers may have a different communication receive rate. In addition, FIG. 16 illustrates that the ATM system can effectively multiplex between multiple PHY layers when receiving.

Figure 17:
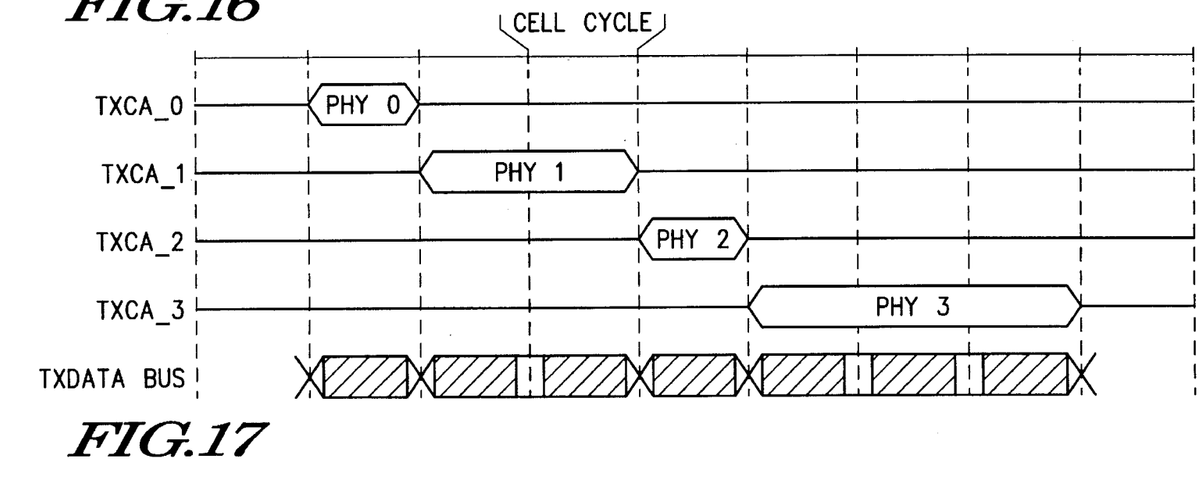

FIG. 17 illustrates a timing diagram of the operation of FIGS. 14 and 15. FIG. 17 illustrates a plurality of transmit cycles. In FIG. 16, one cell is first transmitted from the ATM device to PHY0. Two cells are transmitted from the ATM device to PHY1. Then, one cell is transmitted from the ATM device to PHY2. Finally, three ATM data cells are transmitted from the ATM device to PHY3. FIG. 16 illustrates that multiple ATM data cells can be communicated through different PHY layers so that each of the PHY layers may have a different communication transmission rate. In addition, FIG. 16 illustrates that the ATM system can effectively multiplex between multiple PHY layers when transmitting.

While the present invention has been illustrated and described with reference to specific embodiments, further modifications and improvements will occur to those skilled in the art. For example, other communication protocols besides ATM may use the methods and apparatus taught herein. The signals which have a terminating character '*' are active low signals. These active low signals may easily be designed to be active high or other known signals levels and configurations. Any number of queues can be used in the design herein any number of PHY layers may be coupled to one ATM device. Control signals may be added to the multi-PHY protocol taught herein. ATM data cell size may be any number of bytes long. Plurality is used herein to mean any number within the range of 2 to ∞ and should not be narrowly limited to any particular subrange or constant within 2 to ∞. There are many ways in which to communicate the PID between the ATM layer and the PHY layers, and any of these methods may be used to time multiplex the PHY layers to one ATM layer. It is to be understood, therefore, that this invention is not limited to the particular forms illustrated and that it is intended in the appended claims to cover all modifications that do not depart from the spirit and scope of this invention.

What is claimed is:

1. An asynchronous transfer mode (ATM) system comprising:

an asynchronous transfer mode (ATM) layer device, the ATM layer device having both a plurality of terminals for receiving a transmit bus which has a plurality of transmit conductors and a plurality of terminals for receiving a receive bus which has a plurality of receive conductors;

a first physical (PHY) layer device having both a plurality of transmit terminals coupled to the transmit bus for communicating with the ATM layer device through the plurality of transmit conductors and a plurality of receive terminals coupled to the receive bus for communicating with ATM layer device via the plurality of receive conductors;

a second physical (PHY) layer device having both a plurality of transmit terminals coupled to the transmit bus for communicating with the ATM layer device through the plurality of transmit conductors and a plurality of receive terminals coupled to the receive bus for communicating with ATM layer device via the plurality of receive conductors;

wherein incoming data cells are routed from at least one of the first or second PHY layer devices to the ATM layer device then from the ATM device to a switching device; and wherein outgoing data cells are routed from the switching device to the ATM layer device then from the ATM layer device to at least one of the first or second PHY layers.

2. The ATM system of claim 1 wherein one of either the first physical (PHY) layer device or the second physical (PHY) layer device is selected for communication with the ATM layer device by a control signal communicated between the ATM layer device and the first and second PHY layer devices.

3. The ATM system of claim 1 wherein the first and second PHY layer devices are coupled together in a serial manner via a serial conductor, the serial conductor being used to arbitrate which PHY layer device gains access to the receive bus.

4. The ATM system of claim 1 wherein the first and second PHY layer devices time multiplex the use of the receive bus via a control signal communicated between the first and second PHY layer devices and the ATM layer device.

5. The ATM system of claim 1 wherein the first and second PHY layer devices time multiplex the use of the receive bus via a physical identification (PHY ID) value communicated between the ATM layer device and the first and second PHY layer devices via a data bus portion of the receive bus.

6. The ATM system of claim 1 wherein the first and second PHY layer devices time multiplex the use of the transmit bus via a control signal communicated between the first and second PHY layer devices and the ATM layer device.

7. The ATM system of claim 1 wherein the first and second PHY layer devices time multiplex the use of the transmit bus via a physical identification (PHY ID) value communicated between the ATM layer device and the first and second PHY l layer devices via a data bus portion of the transmit bus.

8. The ATM system of claim 1 wherein the receive bus comprises a receive data bus, a receive enable control signal, and a receive cell available control signal.

9. The ATM system of claim wherein the transmit bus comprises a transmit data bus, a transmit enable control signal, and a transmit cell available control signal.

10. An asynchronous transfer mode (ATM) system comprising:

an asynchronous transfer mode (ATM) layer device which forms an ATM layer, the ATM layer device having terminals for communicating signals via a receive data bus, a receive enable control signal, a receive cell available control signal, a transmit data bus, a transmit enable control signal, a transmit cell available control signal;

N physical layer devices for forming N PHY layer, the N physical layer devices being coupled to the ATM layer device wherein N is a finite positive integer, the N physical layer devices each having terminals coupled to the receive data bus, a receive enable control signal, the receive cell available control signal, the transmit data bus, the transmit enable control signal, the transmit cell available control signal; and means for communicating control values between the ATM layer device and the N Phy layer device to perform handshaking operations which determine when data cells are communicated between the N Phy layer device and the ATM layer device using one of either the receive data bus or the transmit data bus.

11. The ATM system of claim 10 wherein the ATM layer device is coupled to a switching device so that the ATM layer device can communicate data cells to other ATM layer devices which are also coupled to the switching device.

12. The ATM system of claim 10 wherein the control values communicated by the means for communicating are transmitted via a data bus selected from the group consisting of: the receive data bus and the transmit data bus.

13. The ATM system of claim 10 wherein each physical layer in the N physical layers are coupled in a serial manner by a token conductor wherein the token conductor passes information which is used to determine which physical layer in the N physical layers is to use the receive data bus.

14. A method for communicating a data cell in an asynchronous transfer mode (ATM) system, the method comprising the steps of:

providing a data cell to one physical layer in a plurality of physical layers, the one physical layer being determined by communicating a physical layer identification value to the one physical layer;

sending a first control signal to inform an asynchronous transfer mode (ATM) layer that the data cell has been received by the one physical layer;

receiving a second control signal within the one physical layer, the second control signal being sent by the ATM layer to indicate that the one physical layer is to send the data cell from the one physical layer to the ATM layer;

transmitting the data cell from the one physical layer to the ATM layer via a data bus which is coupled between each physical layer in the plurality of bus is time multiplexed between the physical layers in the plurality of physical layers;

transmitting at least a portion of the data cell from the ATM layer to a switching device.

15. The method of claim 14 wherein the physical layer identification value is communicated via the data bus.

16. The method of claim 14 wherein the physical layer identification is communicated via the data bus.

17. A method for communicating a data cell in an asynchronous transfer mode (ATM) system, the method comprising the steps of:

providing a data cell to an asynchronous transfer mode (ATM) layer from a switching device;

sending a first control signal from one physical layer devices device in a plurality of physical layer devices to the ATM layer to inform the ATM layer that the one physical layer devices is capable of receiving the data cell;

sending a second control signal from the ATM layer to the one physical layer devices to initiate transfer of the data cell from the ATM layer to the one physical layer devices wherein the one physical layer devices in the plurality of physical layers devices is determined via the communication of a physical layer devices identification communicated between the ATM layer and the one physical layer devices; and transmitting the data cell from the ATM layer to the one physical layer devices via a data bus which is coupled between each physical layer devices in the plurality of physical layers devices and the ATM layer wherein the data bus is time multiplexed in order to allow the ATM layer to communicate with all physical layers devices in the plurality of physical layers devices.

18. An serial communication system for communicating data cells, the serial communication system comprising:

an central communication layer implemented via a central communication layer device having terminals for communicating signals via a receive data bus, a receive enable control signal, a receive cell available control signal, a transmit data bus, a transmit enable control signal, a transmit cell available control signal;

N physical layer devices for implementing N physical (PHY) layers, the N physical layer devices being coupled to the central communication layer device wherein N is a finite positive integer, the N physical layers each having terminals coupled to the receive data bus, a receive enable control signal, the receive cell available control signal, the transmit data bus, the transmit enable control signal, the transmit cell available control signal; and means for communicating control values between the central communication layer and the N PHY layers to determine which of the N PHY layers is to receive or transmit information using the one of either the receive data bus or the transmit data bus.

19. The serial communication system of claim 18 wherein the serial communication system is an asynchronous transfer mode (ATM) system which communicates data cells having at least 53 8-bit bytes per data cell.

20. An asynchronous transfer mode (ATM) system comprising:

an asynchronous transfer mode (ATM) layer implemented in at least one ATM device having terminals for communicating signals via a receive data bus, a receive enable control signal, a receive cell available control signal, a transmit data bus, a transmit enable control signal, a transmit cell available control signal;

a switching device coupled to the ATM devices for communicating data cells to other ATM layers in the ATM system;

N physical layers (PHY layers) implemented in at least one PHY device for each of the N PHY layers, each of the at least one PHY devices being coupled to the ATM layer wherein N is a finite positive integer, the PHY devices each having terminals coupled to the receive data bus, a receive enable control signal, the receive cell available control signal, the transmit data bus, the transmit enable control signal, the transmit cell available control signal; and means for communicating a physical identification byte between the ATM layer and the PHY layers to determine which of the N PHY layers is to receive or transmit information using the one of either the receive data bus or the transmit data bus.

21. An asynchronous transfer mode (ATM) system comprising:

an ATM switching device;

a first asynchronous transfer mode (ATM) layer device, the first ATM layer device being coupled to the ATM switching device, the first ATM layer device having both a plurality of terminals for receiving a transmit bus which has a plurality of transmit conductors and a plurality of terminals for receiving a receive bus which has a plurality of receive conductors;

a first physical (PHY) layer device having both a plurality of transmit terminals coupled to the transmit bus for communicating with the first ATM layer device through the plurality of transmit conductors and a plurality of receive terminals coupled to the receive bus for communicating with the first ATM layer device via the plurality of receive conductors;

a second physical (PHY) layer device having both a plurality of transmit terminals coupled to the transmit bus for communicating with the first ATM layer device through the plurality of transmit conductors and a plurality of receive terminals coupled to the receive bus for communicating with first ATM layer device via the plurality of receive conductors;

a second asynchronous transfer mode (ATM) layer device, the second ATM layer device being coupled to the ATM switching device, the second ATM layer device having both a plurality of terminals for receiving a transmit bus which has a plurality of transmit conductors and a plurality of terminals for receiving a receive bus which has a plurality of receive conductors;

a third physical (PHY) layer device having both a plurality of transmit terminals coupled to the transmit bus for communicating with the second ATM layer device through the plurality of transmit conductors and a plurality of receive terminals coupled to the receive bus for communicating with second ATM layer device via the plurality of receive conductors; and a fourth physical (PHY) layer device having both a plurality of transmit terminals coupled to the transmit bus for communicating with the second ATM layer device through the plurality of transmit conductors and a plurality of receive terminals coupled to the receive bus for communicating with second ATM layer device via the plurality of receive conductors.

* * * * *